United States Patent [19]

Price et al.

[11] 4,202,527
[45] May 13, 1980

[54] SCISSOR-TYPE VALVE

[75] Inventors: Frank B. Price; Mathieu J. Vertenstein, both of Denver, Colo.

[73] Assignee: Silver Engineering Works, Inc., Denver, Colo.

[21] Appl. No.: 851,884

[22] Filed: Nov. 16, 1977

[51] Int. Cl.² ............................................ F16K 31/124
[52] U.S. Cl. ..................... 251/58; 251/212; 251/279
[58] Field of Search .............. 251/58, 212, 228, 279, 251/280

[56] References Cited

U.S. PATENT DOCUMENTS

| | | | |
|---|---|---|---|
| 1,000,304 | 8/1911 | Sliger | 251/212 |
| 1,343,477 | 6/1920 | Roades | 251/212 |
| 1,590,443 | 6/1926 | Robinson | 251/212 |
| 1,964,663 | 6/1934 | Gossler | 251/212 |
| 1,986,600 | 1/1935 | Pigott | 251/212 |
| 1,992,552 | 2/1935 | Stover | 251/212 |
| 2,199,085 | 4/1940 | Smith | 251/212 |
| 2,270,433 | 1/1942 | Goffredo | 251/212 |
| 2,810,394 | 10/1957 | Ferguson | 251/212 |
| 3,101,736 | 8/1963 | Egger | 251/212 |
| 3,438,316 | 4/1969 | Rodier | 251/212 |
| 3,787,022 | 1/1974 | Wilcox | 251/212 |

Primary Examiner—Martin P. Schwadron
Assistant Examiner—G. L. Walton
Attorney, Agent, or Firm—Edwin L. Spangler, Jr.

[57] ABSTRACT

A fluid control valve having a pair of blades arranged one above the other in superimposed relation for relative movement in parallel planes, each of said blades including means having a generally concave edge, and said concave edges when arranged in opposed overlapped relation cooperating with one another to define an opening whose size varies with the degree of overlap. Simultaneous movement of both blades is such that the edges of the openings therein move either toward or away from one another to vary the size of the opening without appreciably displacing the center thereof. A suitable reciprocating actuator serves as the means for simultaneously actuating both blades, one of said blades being directly connected thereto while the other is operatively associated with the blade so-connected by a rigid link.

8 Claims, 5 Drawing Figures

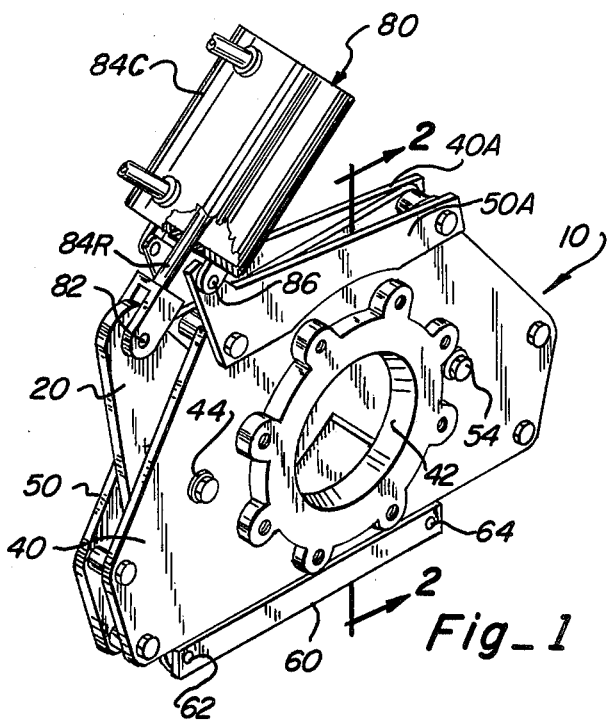
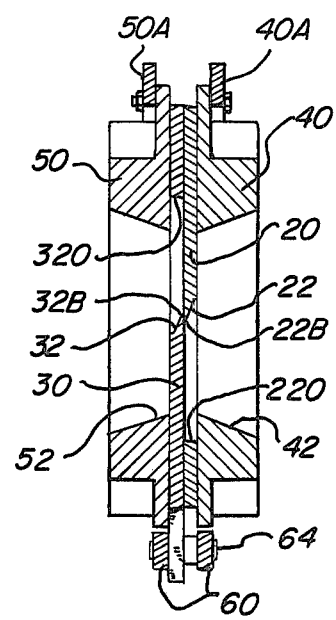
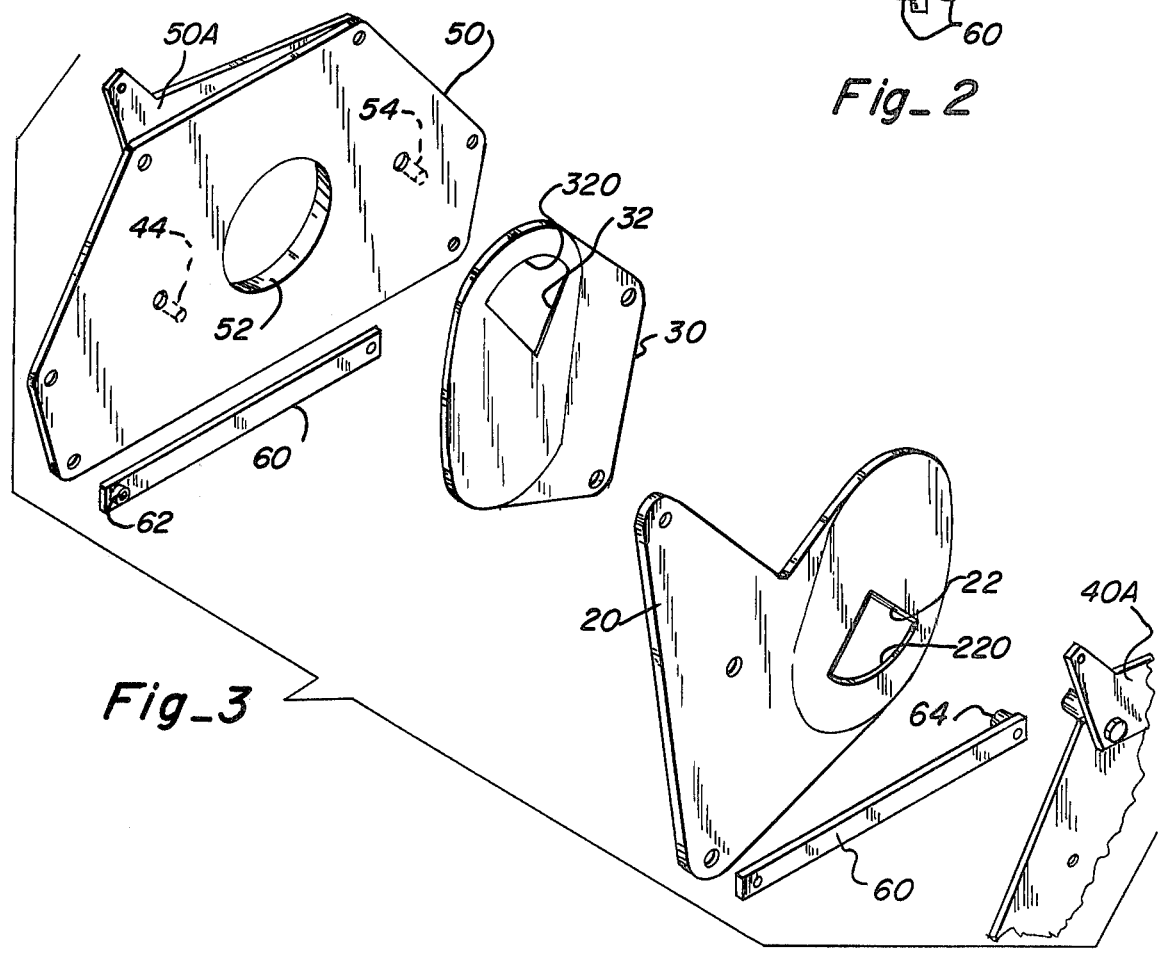

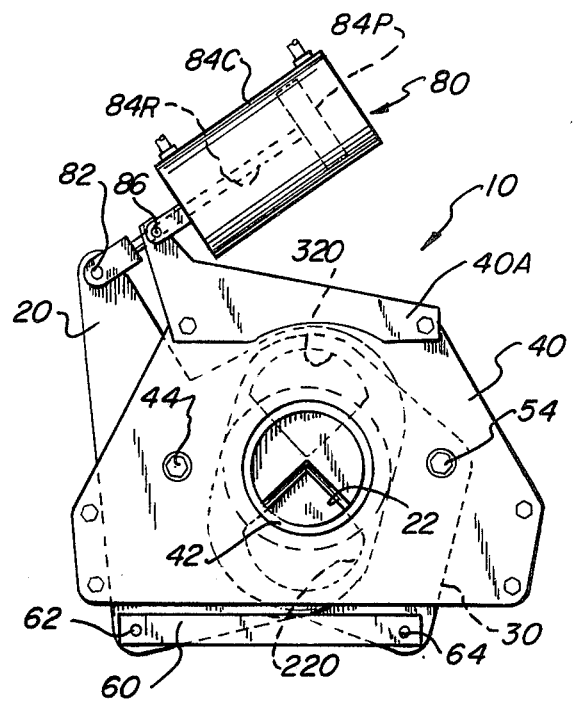
Fig_4
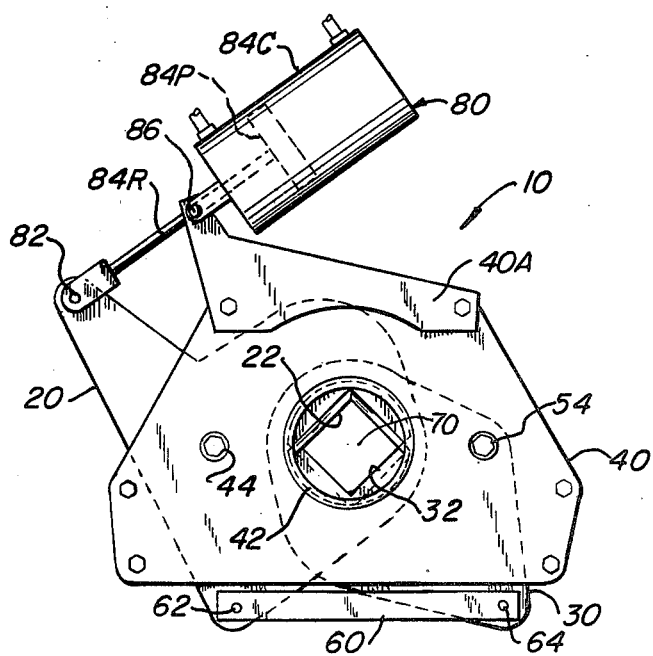
Fig_5

SCISSOR-TYPE VALVE

This invention relates to a scissor-type valve having particular applicability in situations where the center of the valve opening is to remain substantially fixed irrespective of the degree to which the valve is opened or closed. A valve having these characteristics can be useful in many applications, such as in conjunction with centrifugation operations, where a valve positioned above the centrifuge having the aforementioned characteristics can deliver a stream of material at varying flow rates to an essentially fixed point within the basket of the centrifuge, not necessarily the center thereof.

The prior art valves for similar applications have not proven entirely satisfactory. Generally these valves have been of the iris type involving a multiplicity of overlapped plates. These valves are expensive to manufacture, quite complex, susceptible to pluggage and mechanical failures, and difficult to repair. Some other prior art valve designs have not maintained the center of the passage through the valve substantially stationary irrespective of the extent to which the valve passage was opened or closed.

An object of this invention is to provide an inexpensive, relatively lightweight valve in which the center of the passage through the valve is substantially stationary irrespective of the degree to which the passage is open. An additional object is to provide a reliable, relatively simple, easily repairable valve.

The aforementioned objects are accomplished in the instant valve by means of a pair of blades disposed one above the other in parallel superimposed relation. Each blade includes means having a generally concave edge, the two such edges cooperating with one another when in opposed relation with the plates overlapped to define an opening for the passage of fluid and the like through the valve. The plates are each independently pivoted for movement relative to one another; however, the blade actuating means moves both blades simultaneously such that the edges of the opening therein move in opposite directions, either toward one another to reduce the size of the opening or away from one another to enlarge it. The independent pivotal connection of the blades is such that the center of the opening shifts slightly as it changes in size although such shift is so slight as to be negligible.

In the preferred embodiment the blades each have apertures therein and are mounted for independent pivotal movement between a pair of spaced parallel support plates having oversized aligned openings therethrough. A rigid link pivotally attached to each blade connects them together for simultaneous rotational movement about independent centers. A double-acting piston servomotor connected to just one blade of the two actuates both through the link therebetween. When the blades are in overlapped relation with the openings in at least partial registry with one another, a passage is formed. The opposed edge portions of the overlapped openings cooperating to produce the flow passage are preferably mirror images of one another and so designed that they produce a passage of essentially the same more or less regular shape regardless of its size.

FIG. 1 is a perspective view of the valve, portions of the servomotor having been broken away and shown in section;

FIG. 2 is a section to approximately the same scale as FIG. 1 taken along line 2—2 of the latter;

FIG. 3 is an exploded perspective view to the same scale as FIG. 1, portions having been broken away to conserve space;

FIG. 4 is a top plan view to a slightly reduced scale showing the valve in closed position; and FIG. 5 is a top plan view similar to FIG. 4 and to the same scale but differing therefrom in that it shows the valve in open position.

Referring now to FIGS. 1 and 2, the subject valve, generally represented at 10, is shown having a pair of blades 20, 30, preferably located between a pair of spaced substantially parallel support plates 40, 50, having oversized aligned openings 42, 52, respectively, therethrough. Blade 20 is mounted for pivotal movement atop plate 40 by pivot pin 44, while blade 30 is similarly attached to plate 50 for independent pivotal movement by pivot pin 54. In the particular form shown, a rigid link 60 is pivotally affixed at its opposite ends to blades 20, 30, by pivot pins 62, 64, respectively, to effect simultaneous movement thereof. Blades 20, 30 each have means including generally concave edge portions that cooperate in opposed overlapped relation to define a passage 70 for regulating the flow of fluid through valve 10, the dimensions of said passage being determined by the extent to which concave edges 22, 32 overlap one another. The degree of overlap is a function of the relative positions of the blades as hereinafter described.

In the particular form illustrated, generally concave edges 22, 32 comprise opposed portions of openings 220 and 320 within the blades; however, it will become immediately apparent that the selfsame function can be performed thereby, namely, cooperating to define passage 70 if these edges comprise but a part of a notch in the opposing blade edges.

The angle cut edges 22, 32 shown cooperate quite well in varying degrees of overlap to produce a more or less diamond-shaped passage which remains much the same shape regardless of its size and, more significantly, its center does not shift to any meaningful degree when the blades are scissored to and fro. By mounting the blades for pivotal movement about separate pivots 44 and 54 located on opposite sides of the passage 70 instead of a single pivot to one side thereof, the effect of the shifting passage center is minimized and, in fact, rendered inconsequential. Other curved and angle cut edges can, of course, be used cooperatively to define passages of different shapes; however, so far as is known at the present time the resultant more or less diamond-shaped passage 70 is as good, if not better than most.

Another feature of edge portion 22 and 32 is worthy of particular attention and that is the beveled edge 22B on the upstream face of the former and the like undercut beveled edge 32B on the downstream face of the latter. These two beveled surfaces each present a relatively sharp knife-like edge, to the fluid flowing thereover through passage 70 and, as such, they create less turbulence and insure that the stream issuing therefrom will remain relatively undistorted and strike the centrifuge basket at the proper point. The valve is, of course, reversible and when reversed, the selfsame relationship between the beveled edges remains.

The movement of blades 20, 30 may be accomplished by prior art drive means commonly employed in the operation of valves. In the embodiment shown, a double-acting hydraulic or pneumatic servomotor 80 having a piston 84P is shown with its piston rod 84R pivotally affixed to blade 20 by pivot pin 82 while the cylinder 84C itself is pivotally affixed to the plate appendages 40A and 50A by pivot pin 86. It is to be understood that servomotors, such as the one shown, are well known in the art and are not a part of the invention claimed herein. Furthermore, the way in which servomotors such as this are actuated is also well known in the art and no useful purpose will be served by going into it in detail.

Referring to FIGS. 4 and 5, the valve is shown with blades 20, 30, in the positions resulting in passage 70 being completely closed and fully open, respectively. When the valve is in the completely closed position shown in FIG. 4, piston 84P of servomotor 80 is fully retracted. Blades 20 and 30 are so far overlapped that the concave edge portions 22 and 32 thereof do not intersect one another at all to define flow passage 70. As piston 84P is extended, blades 20 and 30 are both caused to rotate about their respective pivot pins 44 and 54 so as to lessen the overlap thereof and bring edge portion 22 into intersecting passage-forming relation with opposed edge portion 32. Finally, with piston 84P moving towards its extended position, as shown in FIG. 5, blades 20 and 30 continue to pivot about their respective pivot pins thereby further reducing the degree of overlap therebetween while, at the same time, enlarging passage 70. Of course, whenever servomotor 80 functions to pivot blade 20, it in turn acts through rigid link 60 to simultaneously rotate blades 20 and 30 in the same direction the same distance and at the same speed. As this occurs, however, the edges 22 and 32 of the openings in these blades are moving toward or away from one another to vary the size of passage 70 because the overlapped portions of the blades are, in fact, moving in opposite directions.

From the aforementioned description it will be appreciated that the exact configuration of blades 20, 30, the location of edges 22, 32, and the location of pivot pins 44, 54, 62, 64, 82 and 86 are interdependent. The final configuration of the valve is also a function of characteristics of the drive means utilized.

The embodiment shown herein does not have seals because, for most applications, the proper machining of the faces of plates 40 and 50 as well as the faces of blades 20 and 30 will obviate the need for seals. Be that as it may, should seals be required, the addition thereof would not require the exercise of invention. Other variations and modifications of this invention will be readily apparent to those skilled in the art without departing from the spirit and scope of that which has been above described.

What is claimed is:

1. In a flow control valve for continuously controlling the size of a stream of fluid containing filterable solids and directing a column thereof into the center of a centrifuge; an upstream blade and a downstream blade mounted one atop the other in superimposed relation for parallel rotational movement, said blades having opposed means movable therewith in scissor-like relation to one another, said opposed means including concave edge portions cooperating in intersecting relation to define a fluid flow passage therethrough, said fluid flow passage remaining essentially the same shape while varying in size upon relative movement of said blades toward and away from one another, and said fluid flow passage being of a shape effective to cause a stream of fluid issuing therefrom to assume and maintain an essentially columnar form irrespective of the size of said passage; blade-supporting means in the form of a plate mounting said blades for pivotal movement about independent axes arranged in spaced parallel relation to one another, said supporting means having an opening therein registering with the flow passage and so sized relative to the latter as to not interfere with the flow therethrough even when fully open; and, blade-actuating means operatively connected to one of said blades link means interconnecting said blades and cooperating with said blade actuating means to effect simultaneously movement thereof so as to maintain the center of the flow passage essentially stationary, said blade-actuating means being located externally of the fluid flow passage in substantially isolated relation to the fluid flow therethrough.

2. The flow control valve as set forth in claim 1 wherein the upstream blade has the concave edge thereof beveled on the surface thereof facing upstream; and, in which the downstream blade has the concave edge thereof beveled on the surface thereof facing downstream, said beveled surfaces cooperating to present a single knife-like edge to the flow through the valve when the opposed means lie in passage-forming relation.

3. The flow control valve as set forth in claim 1 in which: the opposed means comprise openings in the blades movable therewith from misaligned positions completely out of registry with one another into positions in at least partial alignment, said openings when misaligned being effective to close the flow passage, and said openings when even partially aligned functioning to open said flow passage, the degree of overlap of said blades with the openings thus aligned functioning to vary the size of said flow passage.

4. The flow control valve as set forth in claim 1 wherein the concave edge portions cooperate in intersecting relation to define a generally diamond-shaped flow passage.

5. The flow control valve as set forth in claim 1 in which: the blade-actuating means comprises a double-acting piston servomotor pivotally connected between the blade-supporting means and one of the blades and wherein said link means comprises a rigid link operatively linking said one blade to the other of said blades for simultaneous movement in opposite directions in response to actuation of said servomotor.

6. The flow control valve as set forth in claim 5 wherein the blades are mounted for pivotal movement about spaced parallel axes located on opposite sides of the flow passage; and, in which the servomotor and said link to the blade-actuating means are connected on opposite sides of said flow passage with said axes of blade movement therebetween.

7. The flow control valve as set forth in claim 1 wherein the concave edge portions are generally V-shaped.

8. The flow control valve as set forth in claim 1 wherein the axes of pivotal movement are located on opposite sides of the flow passage positioned so as to minimize the shift in the center thereof upon scissor-like movement of the blades.

* * * * *